March 14, 1972  S. G. BART  3,649,477
ELECTROPLATING LARGE CYLINDRICAL TANKS
Filed May 14, 1968  8 Sheets-Sheet 1

INVENTOR
SIEGFRIED G. BART

BY
Lane, Aitken, Dunner & Ziems
ATTORNEYS

March 14, 1972   S. G. BART   3,649,477
ELECTROPLATING LARGE CYLINDRICAL TANKS
Filed May 14, 1968   8 Sheets-Sheet 4

INVENTOR
SIEGFRIED G. BART

BY
Lane, Aitken, Dunner & Ziems
ATTORNEYS

United States Patent Office 3,649,477
Patented Mar. 14, 1972

3,649,477
ELECTROPLATING LARGE CYLINDRICAL TANKS
Siegfried G. Bart, Montclair, N.J., assignor to Bart
  Manufacturing Company, Newark, N.J.
Filed May 14, 1968, Ser. No. 729,099
Int. Cl. C23b *5/56;* B23p *1/00;* B01k *3/04*
U.S. Cl. 204—26                                    11 Claims

ABSTRACT OF THE DISCLOSURE

This specification discloses a method and apparatus for electroplating the interior surface of a large vessel such as the tank of a railroad tank car. A large hole is cut into the end wall of the vessel and a preassembled anode is brought into the vessel through this hole. The vessel is mounted on rollers for rotation about the anode. The hole in the end wall is closed with a circular plate designed for this purpose. The interior surface of the vessel is first activated by treating it with acid and reverse current while the vessel is rotated about the anode and purged by means of an inert gas. The vessel is then partially filled with electroplating solution and is rotated about the anode while the electroplating of the interior surface of the vessel is carried out. The anode is then removed and the portion of the end wall which is cut away is welded back in place, this portion having been previously electroplated in a conventional manner.

BACKGROUND OF THE INVENTION

This invention relates to electroplating the interior surfaces of large cylindrical vessels, and more particularly, to electroplating the interior surface of a vessel such as the tank of a railroad tank car.

It is often desirable for the interior walls of large vessels such as the tanks of railroad tank cars to be lined with corrosion resistant metal such as nickel. Prior to the present invention, known processes for lining the tank cars were very expensive and moreover the linings did not stand up well enough to the corrosive conditions to which the linings were subjected. The present invention provides an improved method and apparatus for lining railroad tank cars and other large cylindrical vessels, which method is less expensive than those of the prior art and which provides a lining which is substantially more resistant to corrosion.

SUMMARY OF THE INVENTION

In accordance with the present invention, a lining of a metal such as nickel is electroplated on the interior surface of a vessel such as the tank of a railroad tank car. The tank is mounted on rollers and is rotated about a stationary anode position within the tank while the electroplating is carried out. The rotation of the tank about the stationary anode makes it possible to get a uniformly distributed electroplated layer on the interior surface of the tank and also makes the electroplated layer more corrosion resistant because it reduces the number of pores in the electroplated layer and thus provides a denser layer. A large hole is cut into the end of the car tank to facilitate getting the anode into and out of the tank. A special plate is provided to close this hole and the anode extends out through a small aperture in the middle of this special plate and has its end supported outside the car tank. The other end of the anode is supported in the end wall of the car tank by a bearing which permits the car tank to rotate relative to the anode.

Accordingly, an object of the present invention is to provide an improved method and apparatus for electroplating the interior surfaces of large cylindrical vessels.

Another object of the present invention is to provide an improved method and apparatus for lining railroad tank cars with corrosion resistant metal.

A further object of the present invention is to reduce the cost of electroplating the interior surfaces of large cylindrical vessels such as railroad tank cars.

A still further object of the present invention is to provide a corrosion resistant electroplated layer on the interior surface of large cylindrical vessels such as a railroad tank car.

Further objects and advantages of the present invention will become readily apparent as the following detailed description of the invention unfolds and when taken in conjunction with the drawings briefly described below.

BRIEF DESCRIPTION OF THE DRAWINGS

FIGS. 8–11 are additional enlarged views showing the details of the anode structure.

FIG. 12 is a view in perspective of the railroad tank car after electroplating.

DESCRIPTION OF THE PREFERRED EMBODIMENTS

Figure 1:
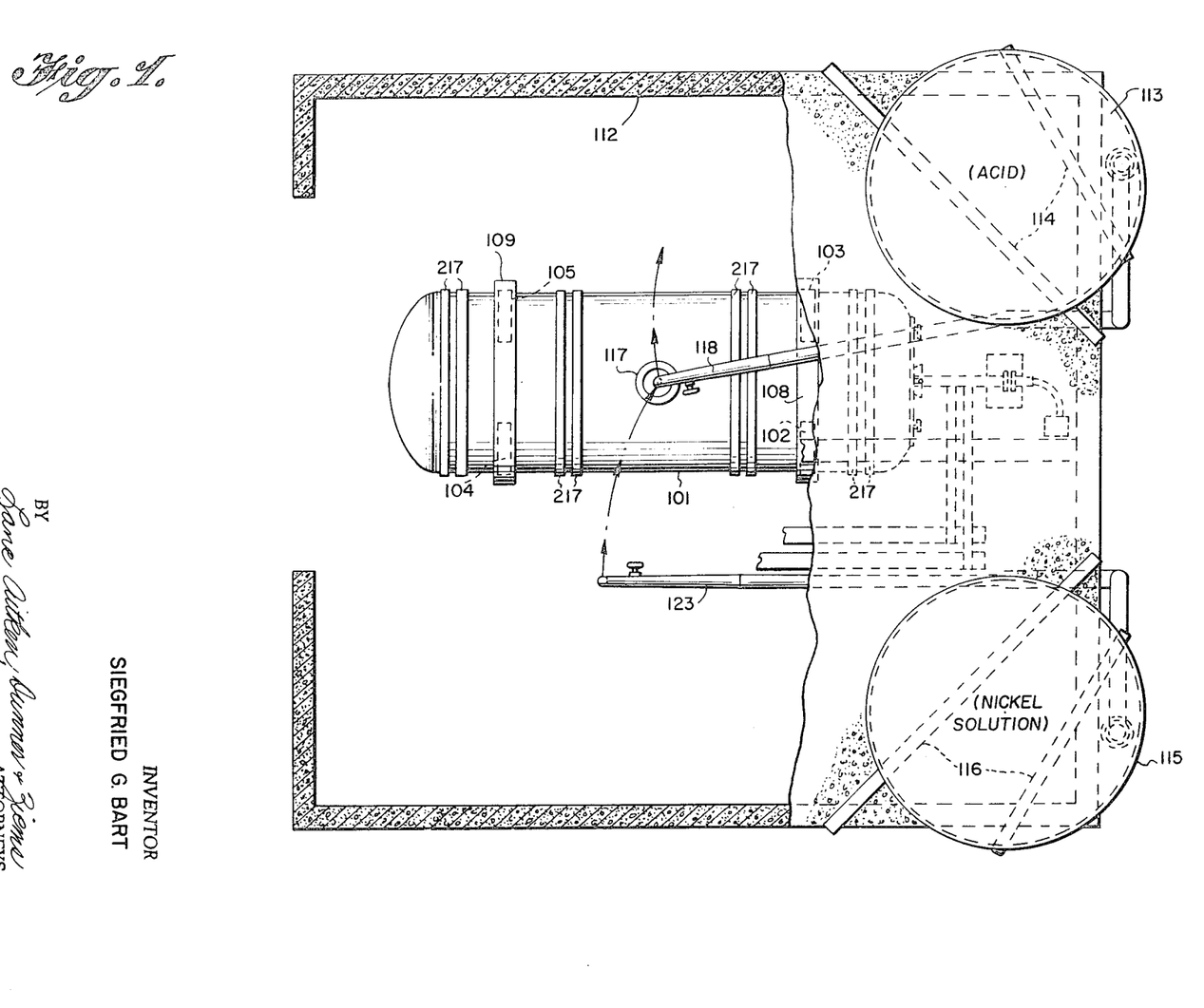
FIG. 1 illustrates a plan view of the apparatus of the present invention showing the location of storage tanks from which solutions are introduced into the tank of the railroad tank car to be electroplated.
Figure 5:
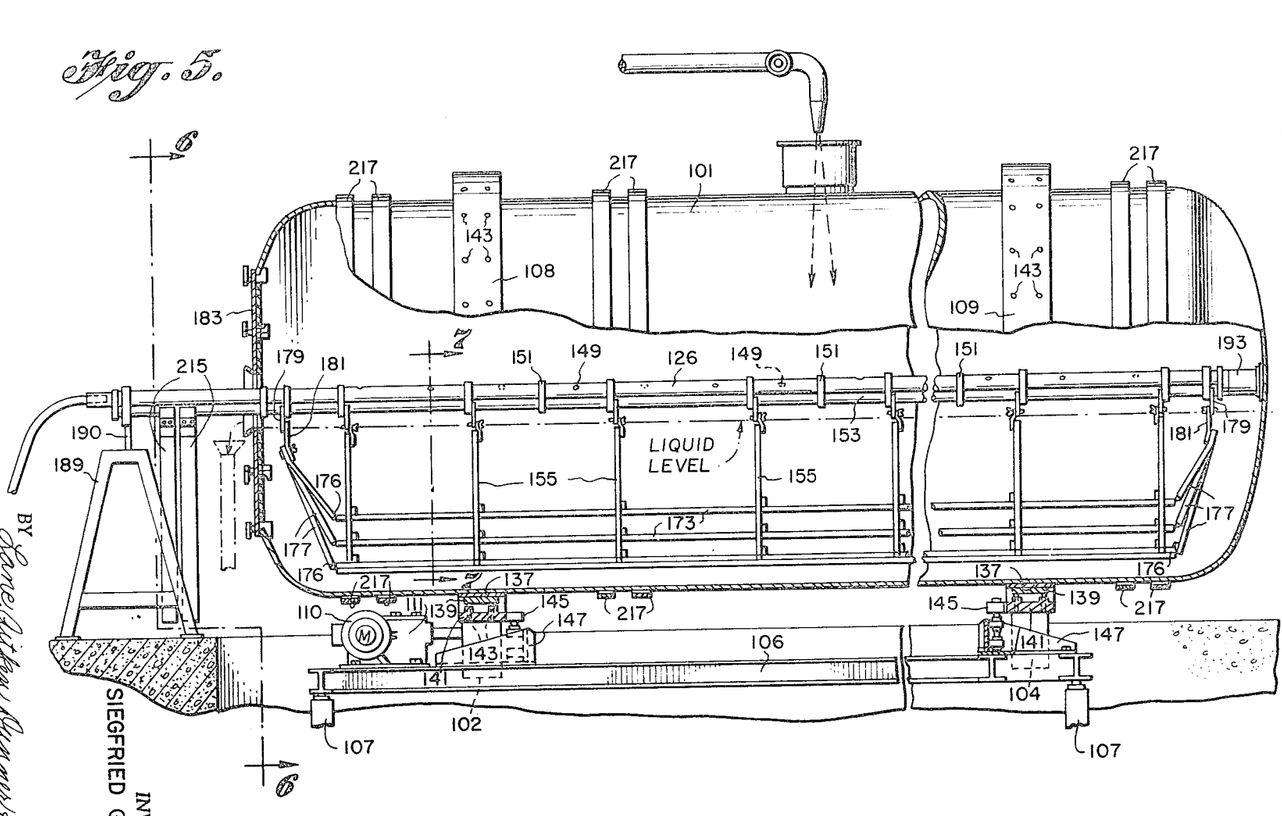
FIG. 5 is a view in partial section illustrating the electroplating apparatus of the present invention with a car tank mounted in position to be electroplated by the apparatus.
Figure 6:
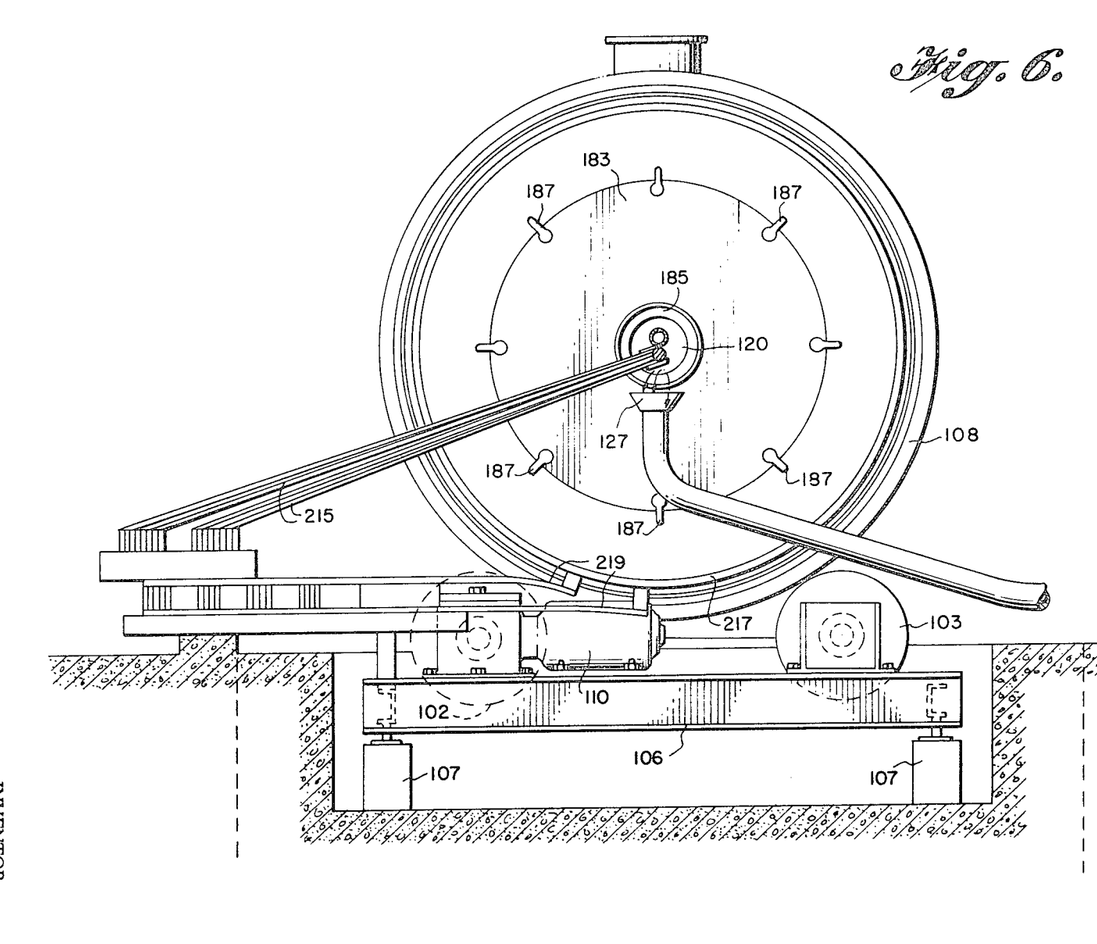
FIG. 6 is a sectional view taken along the line 6—6 of FIG. 5 illustrating an end view of the apparatus and the car tank.

As shown in the drawings, the tank of the railroad tank car, the interior of which is to be electroplated with nickel, is designated by the reference number 101. The tank 101, which is a large cylindrical vessel about 8 or 9 feet in diameter and 28 feet long, is mounted for rotation on rollers 102, 103, 104 and 105 as is illustrated in FIGS. 1, 5 and 6. The rollers 102–105 are rotatably mounted on a frame 106, which is supported by posts 107. The rollers 102 and 103 engage a roller ring 108 surrounding the vessel 101 and mounted thereon. The rollers 104 and 105 engage a roller ring 109 also surrounding the vessel 101 and mounted thereon. The roller rings 108 and 109 are 12½ inches wide. The rollers 102–105 are 11 inches wide and 29 inches in diameter. The roller 102 is driven by a motor 110 through a speed reduction unit 111, which are both mounted on the frame 106. The remaining rollers 103–105 are idler rollers. By driving the roller 102 with the motor 110, the tank 101 can be rotated at the desired speed about its axis.

Prior to the electroplating of the interior surface of the tank 101, the interior surface should be activated. The surface activation is carried out by half filling the tank 101 with an activating solution which will chemically clean the interior surface of the tank so as to enable metal to be plated on such surface to form a metallurgical bond. The activating solution is preferably an approximate 25% by weight aqueous sulfuric acid solution, though other conventional activating solutions may be employed such, for example, as an alkaline descaling solution sold under the trade designation "Endox No. 214"

by the Enthone Division of American Smelting and Refining Corp.

With the tank half filled with activating solution (i.e., acid), the temperature of which is less than about 75° F., the tank is rotated at about three to five revolutions per minute about a fixed electrode, which is positioned within the tank and which during the electroplating will be the anode. While the tank is rotating with the acid, reverse electrolytic current is applied to the interior surface, in effect making the interior surface of the tank the anode and the electrode within the tank a cathode. The reverse current density during this step of activating the interior surface is in the range of about 100–200 amperes per square foot of surface and is applied to the rotating tank for about 8 to 15 minutes. This step of activating the interior surface of the vessel 101 prior to electroplating its interior surface will increase the adhesion of the electroplated layer of metal to the interior surface.

During this activation process, oxygen is liberated at the tank wall and hydrogen is liberated at the electrode within the tank. Thus, a very explosive mixture would accumulate in the tank, particularly in the presence of a platinum cathode, which acts as a catalyst. As is explained below, the electrode within the tank is partly made of platinum. The high current which flows during the activation process could generate enough heat to ignite the mixture of oxygen and hydrogen in the presence of the platinum catalyst. To avoid an explosion, Dry Ice is dumped into the acid within the tank before the reverse current is applied. The Dry Ice provides carbon dioxide to purge the oxygen and hydrogen during the activation process, and also cools the acid. In this manner, the danger of an explosion during the activation step is reduced. Instead of purging the mixture of hydrogen and oxygen by means of Dry Ice, liquid nitrogen could be pumped into the tank through a long tube inserted into the tank through its open end while the activation process is being carried out. The liquid nitrogen would serve to cool the acid and, at the same time, to purge the gaseous mixture of oxygen and hydrogen as it is generated. Alternatively, a relatively inert gas such as carbon dioxide, nitrogen or even air could be pumped into the tank during the activation process to purge the explosive mixture of oxygen and hydrogen.

As shown in FIG. 1, the electroplating of the vessel is carried out within an enclosure defined by walls 112. A storage tank 113 containing the acid to be used in the activating step is supported above the tank 101 on a roof of the enclosure defined by walls 112. The storage tank 113 is supported on beams 114 spanning a corner of the walls 112. A second storage tank 115 containing the electroplating solution is also mounted on the roof supported by beams 116 spanning another corner of the walls 112.

To introduce the acid into the tank 101, the tank 101 is rotated into an upright position in which the manhole 117 of the tank 101 faces upward. A pivoted conduit 118 leading from the storage tank 113 is swung into position over the manhole 117 and a valve in the conduit 118 is opened to permit acid to flow from the storage tank 113 through the conduit 118 and through the manhole 117 to half fill the tank 101. When the tank 101 is about half filled with acid, the flow of acid is shut off, the manhole is closed and sealed and the conduit 118 is swung out of the way. The tank is then rotated while the reverse current is applied as described above.

Figures 2, 3, 4:
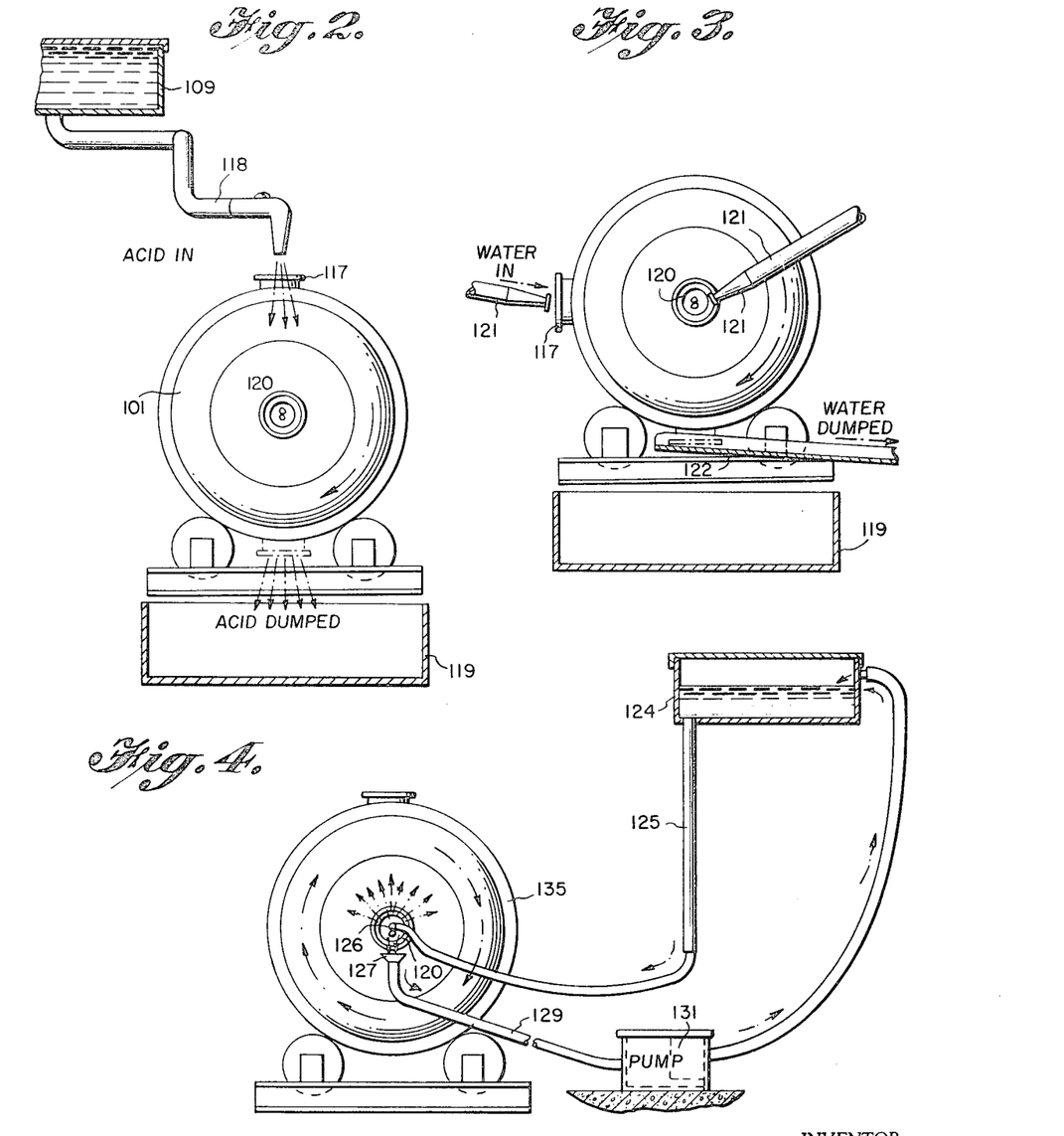
FIGS. 2 and 3 schematically illustrate steps of treating the interior surface of the car tank prior to the actual electroplating of the interior surface of the tank.
FIG. 4 schematically illustrates the manner in which electroplating solution is recirculated duing the electroplating process.

After the activation step has been completed, it is important to transfer the acid out of the tank 101, rinse the tank 101 out and transfer the electroplating solution in the tank 101 in a short period of time in order to prevent the interior surface of the tank 101 from oxidizing so that a good metallurgical bond can be obtained between the electroplated layer and the interior surface of the tank 101. The rapid transfer of acid out of the tank 101 is accomplished by rotating the tank 101 to an inverted position in which the manhole 117 faces downwardly and then dumping the acid out through the manhole into a storage tank positioned below the tank 101 to catch the dumped acid. The steps of introducing the acid into the vessel 101 and then dumping the acid from the vessel are schematically illustrated in FIG. 2. The storage tank for catching the acid dumped out of the tank 101 is designated by the reference number 119 in FIG. 2. While the acid is being dumped, air (or other gas, such as nitrogen) is pumped into the tank 101 through an opening 120 in the end of the tank 101 to be described in more detail below. This air is pumped into the tank 101 to prevent the pressure in the tank 101 from dropping and thus causing a collapse of the tank 101 during the step of dumping.

After the acid is dumped out, the tank 101 is rotated to a 90° position in which the manhole 117 faces horizontally. Water is then introduced into the tank 101 through the manhole and through the opening 120 by means of fire hoses 121 as is schematically illustrated in FIG. 3. After the tank 101 has been filled with water in this manner, the manhole is closed and then the tank 101 is rotated through two complete revolutions to rinse the interior surface of the tank 101. While the tank is being rotated, a trough 122 is moved into position, as schematically shown in FIG. 3, over the acid catching storage tank 119. After the tank 101 has been rotated through two complete revolutions, it is then again brought to its inverted position with the manhole 117 facing downwardly and the manhole is opened allowing the water in the tank 101 to be dumped out into the trough 122, which diverts the dumped water from the acid catching storage tank 119. Again air is pumped into the tank 101 through the opening 120 to prevent the vessel from collapsing during the step of dumping water.

After the water has been dumped, the tank 101 is rotated to an upright position and the tank 101 is half filled with electroplating solution through the manhole 111. The electroplating solution is introduced into the vessel through a pivoted conduit 123, which connects to the storage tank 115. To introduce the electroplating solution into the tank 101, the conduit 123 is swung into position over the manhole 117 and a valve is opened to permit the electroplating solution to flow into the vessel. After the tank 101 is half filled with the electroplating solution, the flow through the conduit 123 is shut off and the conduit is swung out of the way. In this manner, the transfer of the acid, water and electroplating solution to and from the tank 101 is achieved in a short period of time before the interior surface of the tank 101 can oxidize.

After the tank has been half filled with the electroplating solution, the manhole 117 is closed and sealed and the electroplating of the interior of the vessel 101 begins. The flow of electroplating solution during the electroplating is schematically illustrated in FIG. 4. As shown in FIG. 4, the electroplating solution is caused to flow from a replenishing tank 124 through a conduit 125 into a pipe 126 positioned approximately along the axis of the vessel 101. The pipe to be described in more detail below is provided with small apertures throughout its length so that the electroplating solution is sprinkled out of the pipe 126 adding to the electroplating solution already half filling the tank 101. As a result of the flow of electroplating solution into the tank 101 through the pipe 126, electroplating solution will spill out of the vessel through the opening 120 where it is caught by a funnel 127. This flow of electroplating solution into the tank 101 is carried out while the tank 101 is being rotated and while the electroplating of the interior of the vessel is taking place. Larger holes are provided in the pipe 126 at the closed end of the tank 101 so that most of the electrolyte flows down to the closed end. In this manner, good circulation is maintained throughout the entire tank 101. In this manner, the electroplating solution within the tank 101 is maintained fresh during the electroplating process. The streams of electroplating solution which are sprinkled out of the pipe 126 impinge upon the walls of the tank, keeping them wet. In this manner, oxidation of the walls of the tank during the electroplating process is minimized. After being caught by the funnel 127, the spent solution then flows through a conduit 129 to a pump 131, which pumps the solution back to the replenishing tank 124, where the solution is replenished to restore it to its desired electroplating condition before being recirculated back into the tank 101.

While the electroplating solution is being recirculated and continuously replenished in this manner, the tank 101 is rotated at 3 to 5 revolutions per minute about the electrode held stationary within the car tank. This electrode is the anode during the electroplating process. This anode is designed so that the anodic surfaces from which current flows into the electroplating solution during the electroplating process are positioned about six inches from the interior wall of the car tank to be electroplated. To carry out the electroplating, the positive side of a DC power source is connected to the anode and the negative side of the power source is connected to the car tank. The resulting current flowing through the electroplating solution will cause the interior walls of the car tank 101 to be electroplated. Because the car tank is continuously rotated about the anodic surfaces positioned about six inches from the interior wall during the electroplating process, a uniformly thick, dense electroplated layer is obtained on the interior surface of the car tank wall. The layer thus obtained will be free of pores and will not peel or corrode.

In the preferred embodiment, nickel is electroplated onto the interior wall of the car tank and the electroplating solution is an aqueous solution containing about 200 to 400 grams per liter of nickel sulphate ($NiSO_4$) and about 40 to 50 grams per liter of boric acid ($H_3BO_4$). Preferably, the concentration of nickel sulphate is about 300 grams per liter and the concentration of boric acid is about 45 grams per liter. The temperature is maintained in the range of about 140° to 180° F., and preferably at about 160° F. The current density at the interior surface of the car tank wall is maintained in the range of about 20 to 80 amperes per square foot and preferably at about 30 amperes per square foot. The recirculation of the electroplating solution is maintained at a rate to keep the pH of the electroplating solution between about 2 and 4.5 and preferably at about 3.5. The plating is continued until the electroplated layer reaches the desired thickness, which will be in the range of about 0.010 to 0.025 inch or more. The electroplated layer is built up at a rate of about 0.001 inch per hour. In the preferred embodiment, the layer is built up to a thickness of about 0.015 inch and accordingly requires 15 hours of electroplating time.

The structure of the roller rings 108 and 109 in which the car tank is supported and which roll on rollers 102–105 when the car tank is rotated is shown in FIG. 5. The rings 108 and 109 each comprises an inner annular one-half inch thick band 137 which fits tightly around the outer cylindrical surface of the vessel 101. Welded to each band 137 is a three-quarter inch thick annular backup plate 139 extending around the vessel. Outer annular members 141 are supported on the backup plates 139 by set screws 143 distributed about the circumference of the vessel 101. The outer annular members 141 define the annular surfaces of the roller rings 108 and 109 engaged by the rollers 102–105. By means of the set screws 143, the outer annular surfaces are made circular and are centered on the axis of the vessel 101. A thrust roller 145, six inches in diameter, engages the inner radial edge of each of the outer annular members 141. The rollers 145 are rotatably mounted on U-shaped brackets 147 which are bolted to the frame 106. The rollers 145 hold the car tank 101 axially in position.

Preferably, a relatively inert gas is pumped into the tank during the electroplating process to purge any gas liberated during the process. If desired, any of the purging techniques previously described in connection with the activation step may be employed. By using a liquid or solid which converts to a gas, cooling of the electrolyte can be effected simultaneously with purging.

FIGS. 7–11 illustrate details of the electrode which is positioned within the tank 101 and which functions as the anode during the electroplating process. The overall assembly of the electrode can be seen in FIG. 5.

Figure 7:
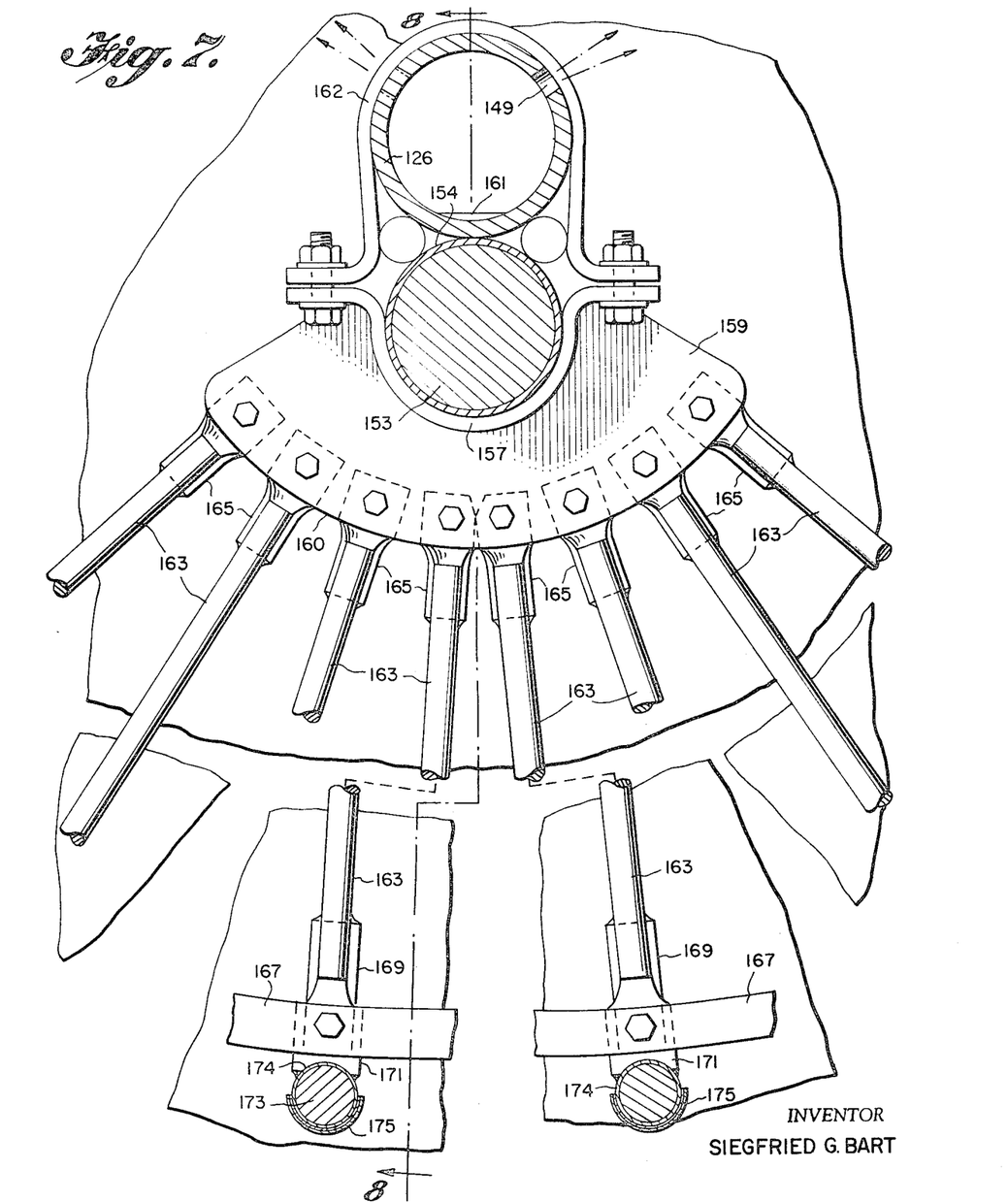
FIG. 7 is an enlarged sectional view taken along the line 7—7 in FIG. 5 illustrating the detailed structure of the anode of the apparatus of the present invention.

The pipe 126 through which the electroplating solution flows during the electroplating process as described above, forms part of the anode assembly. This pipe, which is made out of titanium, has a 3 inch diameter and a 3½ inch outer diameter. The pipe extends along the axis of the tank 101 and has small apertures 149 distributed along its length. The electroplating solution during the electroplating process flows into the car tank 101 through the pipe 126 and is projected in streams through the apertures 149. The apertures are arranged so that the streams formed thereby spray the fresh electroplating solution on the interior walls of the tank 101 above the pool of electroplating solution half filling the car tank 101. Larger holes are provided in the pipe 126 near the closed end of the tank 101 so that most of the electroplating solution flows out of the pipe at the closed end. In this manner, good circulation is maintained throughout the pool of electroplating solution so that the whole pool is kept fresh. Strapped to the pipe 126 by means of tie straps 151 is a solid copper bar 153 three inches in diameter, to which the positive side of a power source is connected during the electroplating process. The copper bar is clad with a layer 154 of titanium as shown in FIG. 7. The straps 151, one of which is shown in detail in FIG. 9, each comprises two U-shaped titanium members 156 and 158 which are bolted together.

Figures 8, 9:
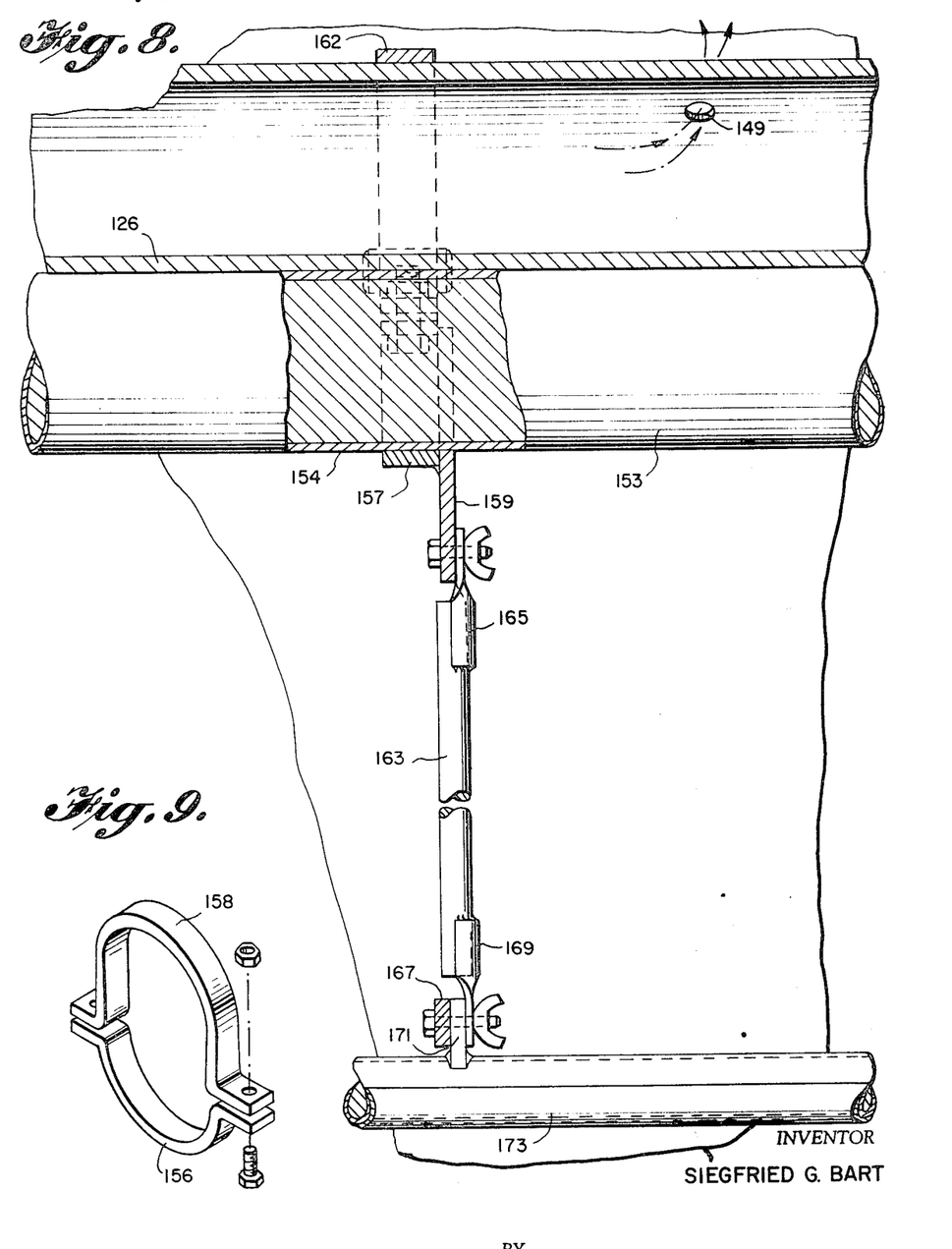

Suspended from the assembly of the pipe 126 and the bar 153 are anode fan assemblies 155 distributed along the length of the vessel 101. The anode fan assemblies are illustrated in detail in the sectional views of FIGS. 7 and 8. The partial section of FIG. 8 is taken along line 8—8 in FIG. 7. Each fan assembly, as shown in FIGS. 7 and 8, comprises two U-shaped titanium strap members 157 and 162 which are bolted together around the assembly of the pipe 126 and the bar 153. A crescent shaped titanium clad copper plate 159, ¼ inch thick, is welded to one edge of the lower titanium strap member 157. The plate 159 has an inner arcuate surface which fits around and connects to the bar 153 and an outer arcuate surface 160 concentric about a point 161 between the center of the bar 153 and the center of the pipe 126. This point is positioned so that in each of the fan assemblies 155, it lies on the axis of the vessel 101. Eight titanium clad copper rods 163, ½ inch in diameter, are suspended from the plate 159 angularly distributed about the point 161 and extending radially outwardly from the point 161. The rods 163 are electrically connected to the plate 159 and mounted on the plate 159 by means of titanium clad copper ferrules 165. The ferrules 165 define semicylindrical sockets into which the ends of the rods 163 fit and the rods 163 are welded to these sockets. The upper ends of the ferrules 165 are flattened out to fit with the plate 159 and are bolted to the plate 159.

The rods 163 extend to within less than a foot of the interior cylindrical surface of the car tank 101. The lower ends of the rods 163 are fixed to an arcuate flat titanium strip 167, which maintains the radial orientation of the rods 163 and which is concentric about the point 161. The titanium strip 167 is mounted on the rods 163 by means of titanium clad copper ferrules 169 which define semi-cylindrical sockets in which the ends of the rods 163 fit and are welded. The lower ends of the ferrules 169 are flattened and are bolted to the titanium strip 167. Titanium clad copper connecting plates 171, ¼ inch thick, are also bolted to the flattened end of the ferrules 169, sandwiched between the strip 167 and the ferrules 169. The ferrules provide electrical connection between the copper connecting plates 171 and the rods 163. The lower ends of the connecting plates 171 define concave arcuate surfaces into which solid copper rods 173 fit and are welded. Thus, the rods 173 are electrically connected to the rods 163 through the ferrules 169 and the plates 171.

The rods 173 are shown in FIG. 5 extend axially the length of the car tank 101 and are electrically connected in this manner to the corresponding rods 163 in each fan assembly 155. Since there are eight rods 163 in each fan assembly, there are eight axially extending rods 173, which are angularly distributed about the axis of the vessel 101 and are positioned at equal radial distances from the axis of the vessel 101. The rods 173, which are one inch in diameter, will be about six inches from the interior cylindrical surface of the vessel 101 to be electroplated. The rods 173 are clad with a layer 174 of titanium. Spot welded to the bottom half of the rods 173 are tantalum strips 175, the exterior surfaces of which are coated with platinum.

It will be noted that not only are the conductive exposed surfaces of the anode structure (viz., the platinum surfaces) spaced from the interior cylindrical surface of the vessel 101, but that the entire anode fan assembly is spaced from such surface. This is in contradistinction to the structure of the apparatus disclosed in Pats 2,689,215 and 2,503,863 in which an anode is adapted to roll by means of insulating spacing rings in contact with the inner wall of a pipe to be electroplated. By eliminating such contact, the apparatus of the present invention provides numerous advantages over that of said two patents. In the first place, there is no material in rolling contact with the surface to be electroplated. This avoids the contamination of the electrodeposit as a result of particles abraded from the insulated spacing rings. Secondly, the lack of such contact avoids the reduction in thickness of the electrodeposit which would take place immediately in the path of the insulated spacing rings. Finally, such direct rolling contact presents difficulties in the electroplating of the tank of a railroad tank car and like structures due to the usually present obstructions (such as heating coils, inlets, etc.) on the interior surface of such tank.

At the same time, however, the use of at least two spaced conducting members (such as rods 173) provides the multiple-phase sine wave effect described in said patents, in which the surface being plated is subjected to a series of rapidly repeated impulses of maximum current-plating densities, with relatively inactive dwells of materially less current-plating densities between the succeeding points of maximum plating densities. The result of this phenomenon is the obtaining of a dense, smooth and uniform deposit which adheres permanently.

It will be further noted that all of the exposed copper in the anode assembly is coated with titanium. If the copper were exposed to the electroplating solution, it would contaminate the solution. The titanium does not contaminate the solution because the titanium becomes passive under the impress of the anode current and will not dissolve nor permit any copper to penetrate to the electroplating solution. The titanium only becomes passive where it is exposed to the electroplating solution so the titanium which is covered with the platinum coated type tantalum strips does not become passive but transmits the anode current to the tantalum strips 175. Tantalum also would become passive under the impress of anode current and for this reason, the exterior surfaces of the tantalum strips are coated with platinum, which does not become passive but transmits the anode current into the electroplating solution. Because of the passive titanium covering of the anode assembly, all of the anode current flows into the plating solution through the platinum coated tantalum strips 175 and an even distribution of anode current to the strips throughout their length is obtained.

Platinum can be coated directly onto the rods 173 instead of using the tantalum strips. However, platinum does not have nearly as good adhesion to titanium as does tantalum to titanium or as does platinum to tantalum. Because of the poor adhesion of platinum to titanium, the platinum becomes removed after a few cycles of reverse current during the activation step when the anode is immersed in acid as described above. When the platinum coated tantalum strips are used, the platinum coating is retained on the anode assembly indefinitely. In addition, the tantalum strips are a better conductor than titanium and for this reason a better distribution is obtained over the length of the anodic surface than is obtained when the platinum is coated directly onto the titanium.

Figures 11, 12:
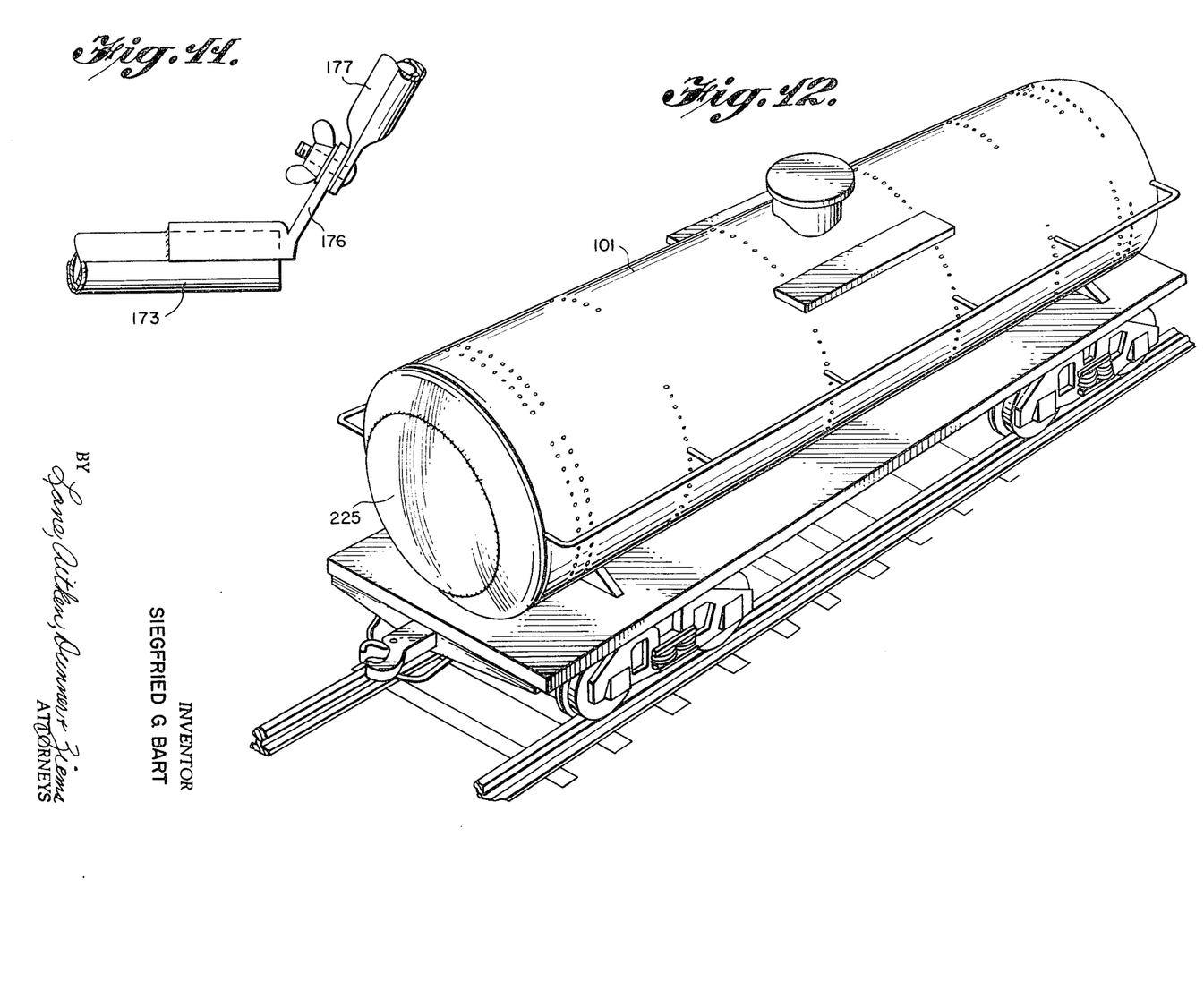

Each end of each of the rods 173 is electrically connected by means of titanium clad copper ferrules 176 to titanium clad copper rods 177 which angle radially inward toward the assembly of the bar 153 and the pipe 126 and toward the ends of the tank as shown. FIG. 11 illustrates one of the ferrules 176 in detail. As shown in FIG. 11, one end of the ferrule 176 defines a semi-cylindrical socket in which one end of one of the rods 173 is received and welded. The other end of the ferrule 176 is bolted to a flattened end of one of the rods 177. The rods 177, which are one inch in diameter, are connected at their other ends to the assembly of the pipe 126 and the bar 153 by means of ferrules and plates in a manner similar to the rods 163. The rods 177 generally parallel the inner surfaces of the ends of the vessel 101 and serve to provide the anodic current to electroplate these surfaces. Accordingly, the sides of the rods 177 which face these end surfaces have spot welded thereto platinum coated tantalum strips.

It will be appreciated that the above described anode structure must be brought into the car tank 101 and then removed from the car tank 101 following the electroplating. This could be accomplished by assembling the anode inside of the car tank 101 and then disassembling the anode following the electroplating process. However, the technique of getting the anode assembly into and out of the car tank 101 is quite expensive and to eliminate this expense a six foot diameter hole was cut in the left end of the car tank 101 as viewed in FIG. 5. The size of this hole was selected to leave enough of the end wall of the vessel 101 surrounding the six foot hole so that the vessel 101 would maintain its cylindrical configuration and would not get out of round. If the entire end wall of the vessel 101 were cut away, the vessel 101 would not maintain its cylindrical configuration. The anode assembly was designed so that preassembled it would fit through this six foot diameter hole while still being effective over an area of at least 20–25% of the interior surface of the tank to be plated.

The anode assembly is provided permanently with a plate 183 which mates with the six foot hole in the end of each vessel 101 to be electroplated and which is best illustrated in FIG. 6. The plate 183 is rubber covered on its inner surface and defines in its center the six inch aperture 120. Surrounding the aperture 120 is an annular lip 185 to facilitate pouring of the overflowing electroplating solution into the funnel 127. The circular plate 183 is held in place closing the circular hole in the end of the vessel 101 by means of locking dogs 187. The rubber covering of the plate 183 forms a fluid tight seal with the edge of the circular hole in the end of the vessel.

The circular portion of the end wall which is cut out and replaced by the plate 183 during the electroplating process is electroplated separately in a conventional manner. After the tank 101 has been electroplated, the cut-out portion is welded back in place.

The pipe 126 and the titanium clad bar 153, as shown in FIG. 5, extend through the aperture 120 to a trestle 189 which supports one end of the anode assembly by means of a supporting member 190 mounted thereon. The other end of the assembly of the pipe 126 and anode bar 153 are rotatably supported in the middle of the end wall of the car tank 101 by means of a bearing member 193, which is illustrated in detail in FIG. 10.

The bearing member 193 comprises a plate 195 which engages a circular nickel pad 197, 19 inches in diameter, welded to the end wall of the tank 101. Three nickel studs 199, also welded to the end wall of the tank 101, extend through the pad 197 and are received in holes defined in the plate 195. The studs 199 are distributed at equal angles about the axis of the tank 101 and will cause the plate 195 to rotate with the tank. Mounted on the plate 195 is a pin 201, which is four inches in diameter, and which will be positioned on the axis of the vessel 101 when the studs 199 are received in the holes defined in the plate 195. The axis of the pin 201 is aligned with the points 161 described with reference to FIG. 7 so that when the studs 199 are received in the holes defined in the plate 195 and the other end of the assembly of the pipe 126 and bar 153 is properly positioned on the trestle 189, the points 161 defining the centers of the fan assemblies described with reference to FIG. 7, will lie on the axis of the vessel 101. The pin 201 is received in a socket 202 defined in a steel socket member 203. The outer cylindrical surface of the socket member 203 is clad with a layer of nickel 204. A nylon liner 205 is press fit into the socket 202 and a bearing surface is provided between the pin 201 and the nylon liner 205. The end of the copper bar 153 is fastened to the socket member 203 by means of a screw 207 which passes through the body of the socket member 203 and threads into the end of the copper bar 153. The head of the screw 207 fits into a recess 209 which is cut into the bottom of the socket 202. A titanium end plate 210 one quarter of an inch thick is fixed to the end of the copper bar 153 and is sandwiched between the bar 153 and the socket member 203. The socket member 203 is provided with a cylindrical portion 211 which fits into the end of the titanium pipe 126 and which is bolted to the end of the titanium pipe 126 by means of a bolt 213. The interior of the pipe 126 is separated from the socket member 203 by means of a plate 214. Thus, when the car tank 101 is rotated by the rollers 202–205, the tank will turn with respect to the anode assembly which will be held stationary with the pin 201 turning in the nylon liner 205.

Copper bus bars 215 clamp to the copper bar 153 between the trestle 189 and the end of the car tank 101 as shown in FIGS. 5 and 6. Copper rings 217, four inches wide and ¼ inch thick, extend around the outer cylindrical surface of the tank. The rings 217 are fixed tightly to the tank by means of steel shims, not shown, distributed around the circumference of the rings 217. The shims are one inch thick, one inch wide and four inches long and extend transversely across the rings 217. The shims also provide electrical connection between the exterior surface of the tank 101 and the copper rings 217. Each of the rings 217 is electrically engaged by brushes 219. During the electroplating, the positive side of the electroplating power source is connected to the bus bars 215 and the negative side of the power source is connected to the brushes 219 to provide the necessary electroplating current. During the step of activating the interior surface of the tank, the positive side of the power source is connected to the brushes 219 and the negative side of the power source is connected to the bus bars 215.

After the electroplating has been carried out to provide a lining of the desired thickness, the electroplating solution is drained out of the tank and the anode together with the plate 108 are removed to be used again to electroplate another tank. In addition, the roller rings 108 and 109 and the copper rings 217 are also removed to be used again. The circular portion of the end wall which was cut out from the tank and separately electroplated as described above is then welded back in place. In the finished railroad tank car as shown in FIG. 12, the circular piece which is welded back in place in the end wall of the tank 101 is designated by the reference number 225.

As noted from the foregoing description, the preferred metal to be electroplated onto the interior surfaces of large vessels is nickel. The process and apparatus of the present invention are, however, equally advantageous in connection with the electroplating of metals other than nickel. Merely by way of example, the foregoing description is applicable to the electroplating of copper, gold, silver, cadmium, zinc, iron, rhodium, platinum group metals and the like.

In addition to the foregoing, certain metals may be substituted for metals employed in the unique anode structure previously described. For example, in lieu of the titanium coatings on the various conductive portions of the anode, tantalum, columbium or zirconium may be employed. Of these substitutes, tantalum is preferred due to its excellent conductivity, though it is to be noted that tantalum is more expensive than titanium and is therefore not preferred relative to the latter except possibly for small diameter members in which conductivity becomes a critical factor.

In lieu of the platinum covering on the exterior surfaces of the tantalum strips 175, other platinum group metals may be used, including rhodium, palladium, osmium, iridium and ruthenium. Of these latter, rhodium and palladium are preferred.

The foregoing description has been set forth in connection with the plating of the tank of a railroad tank car, the plating of which presents substantial problems because of its size and because the interior wall of the tank ordinarily is not continuously smooth. The process and apparatus of the present invention are, however, appropriately adapted to the electroplating of the interior surfaces of other large vesels, particularly those having a diameter of at least about 1½ feet and preferably 2 feet. Similarly, the interiors of large tubular structures may be electroplated in the manner indicated, though to accomplish this it will be necessary to close the ends of the tube. So long as one of the ends is provided with an opening through which the anode may be inserted, the electroplating sequence will be as previously described, though to empty the tube at the end of any step, one of the ends are removed. When used in the specification and claims, the term "vessel" shall be construed to be generic to all of the foregoing.

The above description is of a preferred embodiment of the invention and many modifications may be made thereto without departing from the spirit and scope of the invention, which is defined in the appended claims.

What is claimed is:

1. A method or lining the interior surface of the tank of a railroad tank car, said tank being a large substantially cylindrical hollow vessel having at least one sealable opening intermediates ends, comprising the steps of providing a hole in an end wall of said tank large enough so that a preassembled anode adapted to electroplate the interior surface of said tank can pass through said hole, inserting a preassembled anode into said tank through said hole, mounting said anode for relative rotation of said tank about the axis of said anode, filling said tank at least partially with electroplating solution to immerse at least part of said anode, sealing said sealable opening and rotating said tank and said anode relative to one another about said axis while passing current from said anode to the interior surface of said tank through said electroplating solution.

2. A method as defined in claim 1 wherein closure means are placed over said hole and the level of said electroplating solution at least partially covers the interior surface of said closure means.

3. A method as defined in claim 2 wherein said closure means is provided with a generally axial opening sufficiently smaller than said hole so as not to permit passage therethrough of said preassembled anode.

4. A method of lining the interior surface of a large substantially cylindrical hollow vessel which is devoid of openings sufficiently large to permit the introduction into said vessel of a preassembled anode adapted to electroplate the interior surface of said vessel, comprising the steps of forming a hole in an end wall of said vessel large enough so that said preassembled anode can pass through said hole, inserting said preassembled anode into said vessel through said hole, placing closure means over said hole, said closure means being provided with a generally axial opening sufficiently smaller than said hole so as not to permit passage therethrough of said preassembled anode, mounting said anode for relative rotation of said vessel about the axis of said anode, filling said vessel with electroplating solution to at least partially cover the interior surface of said closure means and to immerse at least part of said anode, and rotating said vessel about its axis while passing current from said anode to the interior surface of said vessel through said electroplating solution.

5. A method as defined in claim 4 wherein said vessel is the tank of a railroad car and wherein said hole is cut to a size small enough to leave sufficien end wall of said tank surrounding said hole to maintain the roundness of said tank.

6. A method as defined in claim 5 wherein said tank is filled with electroplating solution to a level above the lower periphery of said axial opening to cause overflow of said solution therethrough.

7. A method of lining the interior surface of a tank as defined in claim 6 which further comprises retrieving and replenishing said overflow solution so as to render it reusable as electroplating solution and recycling said replenished solution to the interior of said tank.

8. A method of lining the interior surface of the tank of a railroad tank car, said tank being a large substantially cylindrical hollow vessel having at least one sealable opening intermediate its ends, comprising the steps of providing a hole in an end wall of said tank large enough so that a preassembled anode adapted to electroplate the interior surface of said tank can pass through said hole, inserting said preassembled anode into said tank through said hole, placing closure means over said hole, said closure means being provided with a generally axial opening sufficiently smaller than said hole so as to prevent passage therethrough of said preassembled anode, mounting said anode for relative rotation of said tank about the axis of said anode, charging said tank with an activating solution and immersing said anode in said activating solution, rotating said tank and said anode relative to one another about said axis with said activating solution contained therein, passing reverse current from the interior walls of said tank to said anode through said activating solution, dumping said activating solution out of said tank, filling said tank at least partially with electroplating solution to a level above the lower periphery of said axial opening to immerse at least part of said anode and to cause overflow of said solution therethrough, rotating said tank and said anode relative to one another about said axis, passing current from said anode through said electroplating solution to the interior surface of said tank while said tank is rotating so as to form an electrodeposit on said interior surface, retrieving and replenishing said overflow solution so as to render it reusable as electroplating solution and recycling said replenished solution to the interior of said tank.

9. A method of lining the interior surface of the tank of a railroad tank car as recited in claim 8 further comprising the steps of charging said tank with a rinse after dumping said activating solution and prior to the charging of said tank with electroplating solution, rotating said tank about its axis with said rinse contained therein, and then dumping said rinse out of said tank.

10. A method as defined in claim 9 wherein the dumping of said activating solution, rinsing, and charging of said electroplating solution is effected in a sufficiently short period of time to prevent the oxidation of the interior surface of said tank.

11. A method of lining the interior surface of the tank of a railroad tank car as defined in claim 8 wherein said lining is nickel.

References Cited

UNITED STATES PATENTS

| | | | |
|---|---|---|---|
| 1,076,424 | 10/1913 | Held | 204—26 |
| 1,720,354 | 7/1929 | Schwartz | 204—26 |
| 1,793,069 | 2/1931 | Dunkley | 204—26 |
| 1,794,487 | 3/1931 | Schwartz | 204—26 |
| 1,850,426 | 3/1932 | Tyrrell | 204—26 |
| 1,904,432 | 4/1933 | Fink | 204—26 |
| 2,726,201 | 12/1955 | Prine | 204—26 |
| 3,247,013 | 4/1966 | Spraul et al. | 117—94 |

FOREIGN PATENTS 213,397   2/1958   Australia.

JOHN H. MACK, Primary Examiner

T. TUFARIELLO, Assistant Examiner

U.S. Cl. X.R.

204—215, 288

UNITED STATES PATENT OFFICE
CERTIFICATE OF CORRECTION

Patent No. 3,649,477         Dated March 14, 1972

Inventor(s) Siegfried G. Bart

It is certified that error appears in the above-identified patent and that said Letters Patent are hereby corrected as shown below:

Column 1, line 54, "position" should be --positioned--.
Column 2, line 24, "duing" should be --during--;
    line 69, "mate" should be --mately--.
Column 4, line 19, --half-- should appear after "been".
Column 7, line 4, "are" should be --as--.
Column 10, line 52, "intermediates" should be --intermediate it:
Column 11, claim 5, line 3, "sufficien" should be --sufficient--

Signed and sealed this 18th day of July 1972.

(SEAL)
Attest:

EDWARD M. FLETCHER, JR.
Attesting Officer

ROBERT GOTTSCHALK
Commissioner of Patents